(12) United States Patent
Hung et al.

(10) Patent No.: US 8,265,389 B2
(45) Date of Patent: Sep. 11, 2012

(54) COLOR ENHANCEMENT FOR DIGITAL IMAGES

(75) Inventors: Szepo Robert Hung, Carlsbad, CA (US); Xiaoyun Jiang, San Diego, CA (US); Hsiang-Tsun Li, San Diego, CA (US)

(73) Assignee: QUALCOMM Icorporated, San Diego, CA (US)

( * ) Notice: Subject to any disclaimer, the term of this patent is extended or adjusted under 35 U.S.C. 154(b) by 1105 days.

(21) Appl. No.: 12/167,007

(22) Filed: Jul. 2, 2008

(65) Prior Publication Data

US 2010/0002090 A1 Jan. 7, 2010

(51) Int. Cl.
*H04N 5/228* (2006.01)
*G06K 9/00* (2006.01)
(52) U.S. Cl. ........ 382/168; 382/254; 345/589; 345/590; 345/591
(58) Field of Classification Search .................. None
See application file for complete search history.

(56) References Cited

U.S. PATENT DOCUMENTS

| | | | |
|---|---|---|---|
| 5,103,299 A | 4/1992 | Asaida | |
| 5,130,935 A | 7/1992 | Takiguchi | |
| 6,791,716 B1 * | 9/2004 | Buhr et al. | 358/1.9 |
| 2006/0227227 A1 * | 10/2006 | Tsuruoka | 348/241 |

FOREIGN PATENT DOCUMENTS

| | | |
|---|---|---|
| EP | 1326425 A2 | 7/2003 |
| EP | 1326425 A2 * | 7/2003 |
| EP | 1385331 A2 | 1/2004 |
| EP | 1819143 A1 | 8/2007 |
| EP | 1919190 A2 | 5/2008 |

OTHER PUBLICATIONS

International Search Report and Written Opinion—PCT/US2009/049312—International Search Authority—European Patent Office, Sep. 11, 2009.

* cited by examiner

*Primary Examiner* — Jason M Repko
*Assistant Examiner* — Thomas A James
(74) *Attorney, Agent, or Firm* — Matthew J. Evans; Ashish L. Patel

(57) ABSTRACT

Techniques for identifying and enhancing colors in a digital image associated with one or more target color shades. In an embodiment, the target color shades may include a shade of blue associated with the sky, a shade of green associated with outdoor foliage, or the color red. In an embodiment, the blue chroma (Cb) and red chroma (Cr) coordinates of a pixel are evaluated to determine whether to apply an enhancement factor. The enhancement factor may incorporate an exposure index (EI) auxiliary enhancement factor, a color temperature (D) auxiliary enhancement factor, and a luminance (Y) of each pixel. Further aspects for implementing the techniques in software and hardware are disclosed.

30 Claims, 5 Drawing Sheets

COLOR ENHANCEMENT FOR DIGITAL IMAGES

BACKGROUND

1. Field

The disclosure relates to color enhancement for digital images. In particular, the disclosure relates to techniques for detecting and enhancing one or more target color shades in a digital image.

2. Background

In digital photography, the presence of crisp green foliage and blue skies in outdoor images may form a pleasing viewing experience for the human eye. For this reason, digital image editing tools often include an option for enhancing the saturation of such colors in a digital photograph. However, such tools usually lack the capability to distinguish shades of green attributable to outdoor foliage from other shades of green, or shades of blue attributable to the sky from other shades of blue. This leads to the image editing tool usually being either over- or under-inclusive in the identification and enhancement of such colors. Alternatively, the tool may require a user to manually select the regions of an image to enhance.

It would be desirable to provide digital image processing tools for accurately identifying and enhancing the shades of one or more target color shades, such as green, blue, or red, in a digital image.

SUMMARY

An aspect of the present disclosure provides a method for evaluating and enhancing the color of pixels in a digital image, each pixel having associated Y-Cb-Cr coordinates. The method includes multiplying the Cb coordinate of each pixel by a Cb enhancement factor and multiplying the Cr coordinate of each pixel by a Cr enhancement factor. Each of the Cb and Cr enhancement factors includes a function of the Cb and Cr coordinates of each pixel.

Another aspect of the present disclosure provides an apparatus for evaluating and enhancing the color of pixels in a digital image, each pixel having associated Y-Cb-Cr coordinates. The apparatus includes a multiplier for multiplying the Cb coordinate of each pixel by a Cb enhancement factor and a multiplier for multiplying the Cr coordinate of each pixel by a Cr enhancement factor. Each of the Cb and Cr enhancement factors includes a function of the Cb and Cr coordinates of each pixel.

Yet another aspect of the present disclosure provides an apparatus for evaluating and enhancing the color of pixels in a digital image, each pixel having associated Y-Cb-Cr coordinates. The apparatus includes means for enhancing the Cb coordinate of each pixel by a Cb enhancement factor and means for enhancing the Cr coordinate of each pixel by a Cr enhancement factor.

Yet another aspect of the present disclosure provides a computer program product for evaluating and enhancing the color of pixels in a digital image, each pixel having associated Y-Cb-Cr coordinates. The product includes computer-readable medium including code for causing a computer to multiply the Cb coordinate of each pixel by a Cb enhancement factor and code for causing a computer to multiply the Cr coordinate of each pixel by a Cr enhancement factor. Each of the Cb and Cr enhancement factors includes a function of the Cb and Cr coordinates of each pixel.

DETAILED DESCRIPTION

According to the present disclosure, techniques are provided for automatically identifying and enhancing selected shades of target colors in a digital image. In certain embodiments, the techniques may be used to enhance shades of green attributable to outdoor foliage, shades of blue attributable to the sky, or shades of any other color selected by a user, such as red.

In the art of digital imaging, Y-Cb-Cr is a color coordinate scheme used to encode pixel color, wherein Y represents a luma component, and Cb and Cr represent the blue and red chroma components, respectively. According to this scheme, each pixel's color may be characterized by a set of Y-Cb-Cr coordinates, with Cb and Cr typically normalized to values from −1.0 to 1.0, and Y typically normalized to a value from 0 to 1.0, or alternatively, from 0 to 255.

In an embodiment, to transform a pixel P in a digital image having color coordinates Y(P)-Cb(P)-Cr(P) into an enhanced color pixel P* having color coordinates Y(P*)-Cb(P*)-Cr(P*), the following transformations may be performed (Equations 1):

$$Cb(P^*) = Cb(P) * K_{Cb}(P);$$

$$Cr(P^*) = Cr(P) * K_{Cr}(P);$$

wherein $K_{Cb}(P)$ and $K_{Cr}(P)$ are enhancement factors, and the Y component Y(P) is left unaltered, i.e., Y(P*)=Y(P). In an embodiment, $K_{Cb}(P)$ is chosen to be equal to $K_{Cr}(P)$, and both $K_{Cb}(P)$ and $K_{Cr}(P)$ may be denoted by a single factor K(P) for simplicity. In an embodiment, the factor K(P) may be made dependent on certain properties of the original pixel P and/or the digital image containing the pixel P, as further described hereinbelow.

Note one of ordinary skill in the art will appreciate that pixel enhancement may be done in ways other than multiplying a pixel's coordinates by an enhancement factor. For example, pixel coordinates may be raised to a certain exponential power related to K(P), or linearly or non-linearly combined using alternative transformations based on K(P). Such embodiments are contemplated to be within the scope of the present disclosure.

In an embodiment, the enhancement factor K(P) may be adjusted based on whether the pixel P has a color corresponding to a target color shade to be enhanced. In an embodiment, to make this determination, the Cb-Cr coordinates of the pixel P may be used to assign each pixel in a digital image to one of at least three regions: a Cb-Cr Region I wherein the pixel P is of the target color shade, a Cb-Cr Region III wherein the pixel P is not of the target color shade, and a Cb-Cr Region II wherein the pixel P is of a color lying in a transition region between Cb-Cr Regions I and III.

Figure 1:
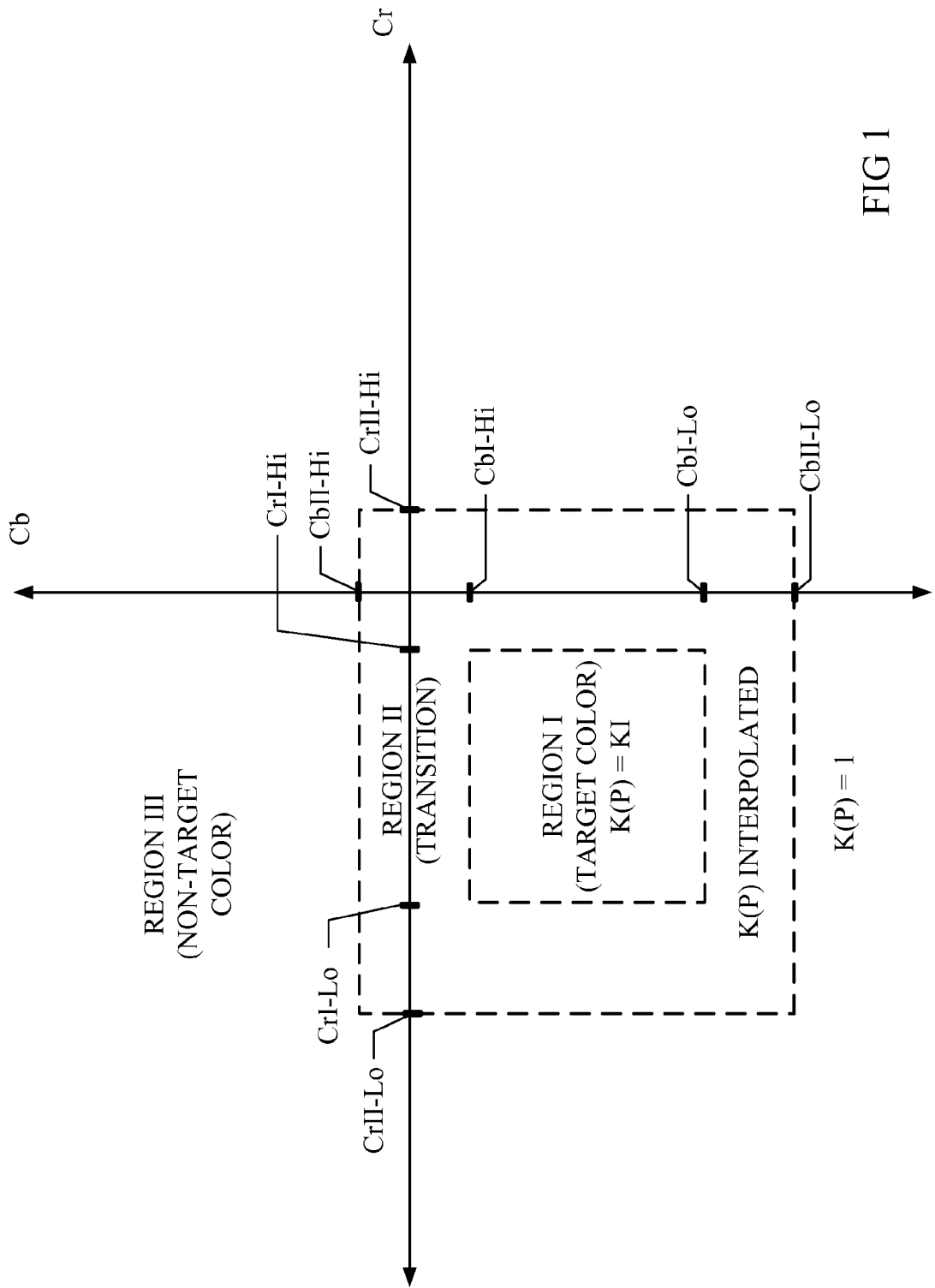
FIG. 1 illustrates an embodiment of designated regions in the Cb-Cr plane to which the pixel P may be assigned.

FIG. 1 illustrates an embodiment of three designated regions in the Cb-Cr plane to which the pixel P may be assigned. Note the Cb-Cr coordinates and regions illustrated in FIG. 1 are provided for illustrative purposes only, and are not meant to limit the scope of the present disclosure to any particular colors or shades of colors suggested by the Cb-Cr coordinates and regions shown. One of ordinary skill in the art will also appreciate that a different number of regions than described herein may be readily accommodated in alternative embodiments, and that such embodiments are also contemplated to be within the scope of the present disclosure.

In FIG. 1, if a pixel P has Cb-Cr coordinates lying in a designated Cb-Cr Region I, the pixel P is adjudged to correspond to a target color shade to be enhanced. In FIG. 1, the boundaries of Region I are set as extending from $Cr_{I-lo}$ to $Cr_{I-hi}$ along the Cr axis, and from $Cb_{I-lo}$ to $Cb_{I-hi}$ along the Cb axis. If a pixel P lies in Region I, then its corresponding enhancement factor K(P) may be set to a constant value KI greater than 1.0, leading to possible enhancement of the pixel P.

If a pixel P has Cb-Cr coordinates lying in a designated Cb-Cr Region III, the pixel P is adjudged to not correspond to the target color shade to be enhanced. In FIG. 1, the boundaries of Region III are set as extending from $Cr_{II-lo}$ to −1.0 and from $Cr_{II-hi}$ to +1.0 along the Cr axis, and from $Cb_{II-lo}$ to −1.0 and from $Cb_{II-hi}$ to +1.0 along the Cb axis. In an embodiment, the enhancement factor K(P) may be set to a constant value 1.0 if the pixel P lies in Region III, leading to no enhancement.

If a pixel P has Cb-Cr coordinates lying in a designated Cb-Cr Region II, corresponding to the area lying between Regions I and III, a pixel is adjudged to be in a transition region. In an embodiment, the enhancement factor K(P) in Cb-Cr Region II may be interpolated between the values KI and 1.0, depending on the relative distance of the point [Cr(P), Cb(P)] from the Cb-Cr Regions I and III. The interpolation helps ensure a smooth transition in the auxiliary enhancement factor K(P), which may help improve the visual effect of the color enhancements described.

In an embodiment, the interpolation may be a linear interpolation, such that K(P) decreases linearly in Cb-Cr Region II from the boundary of Cb-Cr Region I (where K(P) has a value of KI) to the boundary of Cb-Cr Region III (where K(P) has a value of 1.0).

In an embodiment, the parameters of the enhancement factors for multiple colors blue $K^b(P)$, green $K^g(P)$, and red $K^r(P)$ may be as follows (Table 1):

| Auxiliary enhancement factor | Parameter | Value |
|---|---|---|
| $K^b(P)$ | KI | 1.5 |
|  | $Cr_{I-lo}$ | −1.0 |
|  | $Cr_{I-hi}$ | −0.2 |
|  | $Cr_{II-lo}$ | −1.0 |
|  | $Cr_{II-hi}$ | −0.1 |
|  | $Cb_{I-lo}$ | 0.1 |
|  | $Cb_{I-hi}$ | 1.0 |
|  | $Cb_{II-lo}$ | 0.0 |
|  | $Cb_{II-hi}$ | 1.0 |
| $K^g(P)$ | KI | 1.7 |
|  | $Cr_{I-lo}$ | −1.0 |
|  | $Cr_{I-hi}$ | −0.1 |
|  | $Cr_{II-lo}$ | −1.0 |
|  | $Cr_{II-hi}$ | 0 |
|  | $Cb_{I-lo}$ | −1.0 |
|  | $Cb_{I-hi}$ | −0.1 |
|  | $Cb_{II-lo}$ | −1.0 |
|  | $Cb_{II-hi}$ | 0 |
| $K^r(P)$ | KI | 1.3 |
|  | $Cr_{I-lo}$ | 0.35 |
|  | $Cr_{I-hi}$ | 1.0 |
|  | $Cr_{II-lo}$ | 0.2 |
|  | $Cr_{II-hi}$ | 1.0 |
|  | $Cb_{I-lo}$ | −1.0 |
|  | $Cb_{I-hi}$ | 1.0 |
|  | $Cb_{II-lo}$ | −1.0 |
|  | $Cb_{II-hi}$ | 1.0 |

Note the parameters given above are for illustrative purposes only, and are not meant to limit the scope of the present disclosure to any particular values shown. In alternative embodiments, color regions other than those listed in Table 1 may be defined for enhancement. In alternative embodiments, the color regions corresponding to blue, green, and red may have values of KI or boundary parameters different than those shown above.

In an embodiment, the enhancement factor K(P) may itself be derived from at least one other auxiliary enhancement factor, such other auxiliary enhancement factor in turn derived from a specific pixel property or set of properties, as further described hereinbelow. For example, K(P) may vary depending on an auxiliary enhancement factor $K_{EI}$ derived from the exposure index (EI) of an automatic exposure control (AEC) mechanism of a digital camera. K(P) may also vary depending on an auxiliary enhancement factor $K_D$ derived from a color temperature D as determined by an automatic white balance (AWB) mechanism of a digital camera. K(P) may also vary depending on a component $K_Y(P)$ derived from the Y-value of the pixel P.

Details of auxiliary enhancement factors are given hereinbelow. Note one of ordinary skill in the art will realize that such factors are described for illustrative purposes only, and are not meant to limit the scope of the present disclosure to any particular factors given herein. Alternative embodiments may employ the techniques of the present disclosure along with other enhancement techniques or auxiliary enhancement factors not explicitly described herein.

Figure 2:
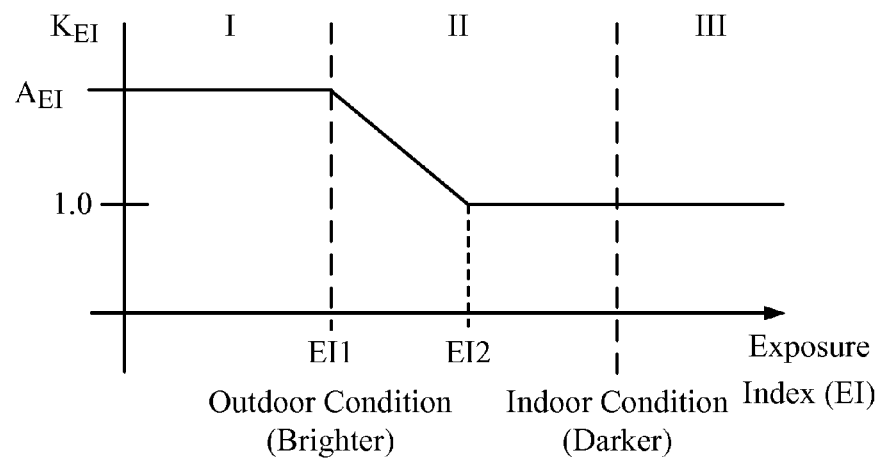
FIG. 2 illustrates an auxiliary enhancement factor $K_{EI}$ derived from an exposure index (EI) of a digital image.

FIG. 2 illustrates an auxiliary enhancement factor $K_{EI}$ derived from an exposure index (EI) used by a digital camera to generate an image containing the pixel P. One of ordinary skill in the art will appreciate that an exposure index may represent an index into an exposure table, wherein each entry in the exposure table contains an image sensor gain and exposure time used to capture a digital image. In an embodiment, a smaller index refers to smaller gain and shorter exposure time for the image, corresponding to brighter light, while a larger index refers to larger gain and longer exposure time, corresponding to darker light. One of ordinary skill in the art will realize that an EI may typically be specified in units of Lux. Note the derivation of an exposure index (EI) for a digital image is known to one of ordinary skill in the art, and will not be further described herein.

In FIG. 2, the auxiliary enhancement factor $K_{EI}$ is chosen to have a value $A_{EI}$ greater than 1.0 in an EI Region I, corresponding to an EI indicative of bright light (outdoor) conditions. $K_{EI}$ is chosen to have a value 1.0 in an EI Region III, corresponding to an EI indicative of dark light (indoor) conditions. In the embodiment shown, $K_{EI}$ is further specified to have a continuous transitional characteristic in an EI Region II, between the values EI1 and EI2, corresponding to an EI indicative of lighting conditions between bright light and dark light conditions.

In the embodiment shown, $K_{EI}$ is further specified to linearly decrease from a value of $A_{EI}$ at EI=EI1 to a value of 1.0 at EI=EI2.

One of ordinary skill in the art will realize that the dependence of the auxiliary enhancement factor $K_{EI}$ on EI shown in FIG. 2 is shown for illustrative purposes only. $K_{EI}$ may generally have an arbitrary dependence on EI. In an embodiment (not shown), $K_{EI}$ may decrease non-linearly with increasing EI.

In an embodiment, the auxiliary enhancement factor $K_{EI}$ may be incorporated into the enhancement factor $K(P)$ by setting the parameter KI for $K(P)$ to be the EI-dependent auxiliary enhancement factor $K_{EI}$. In this way, the enhancement factor $K(P)$ may be upper-bounded by the auxiliary enhancement factor $K_{EI}$.

Figure 3:
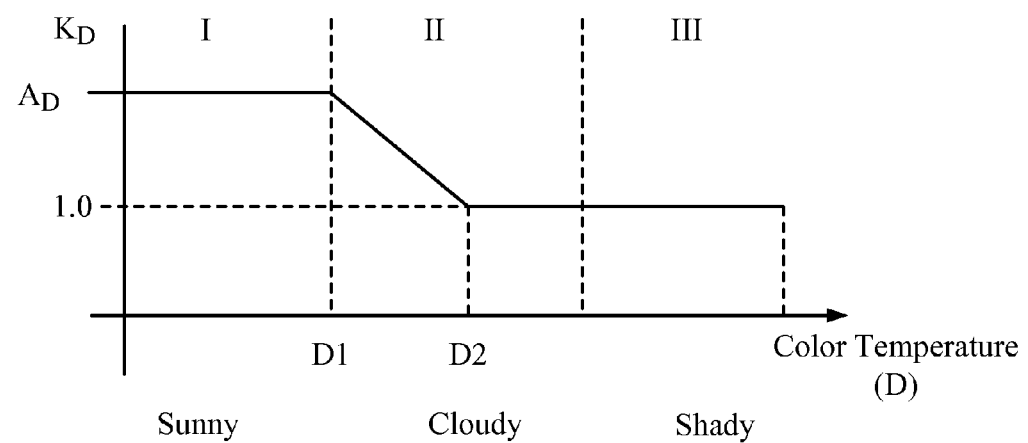
FIG. 3 illustrates an auxiliary enhancement factor $K_D$ based on a color temperature (D) of the digital image.

FIG. 3 illustrates another auxiliary enhancement factor $K_D$ based on a color temperature of the digital image. In an embodiment, the color temperature of a digital image (commonly expressed using the daylight illuminant "D") may be derived from an automatic white balance (AWB) mechanism used by a digital camera to generate an image containing the pixel P. One of ordinary skill in the art will appreciate that the color temperature may correspond to the temperature at which a heated black-body radiator matches the color of the light source used in a digital image. Note the derivation of a color temperature for a digital image will be known to one of ordinary skill in the art, and will not be described further herein.

In FIG. 3, the auxiliary enhancement factor $K_D$ is shown as having a value $A_D$ greater than 1.0 in a color temperature Region I, corresponding to a color temperature (D) indicative of sunny conditions. Meanwhile, in a color temperature Region III, corresponding to a color temperature (D) indicative of shady conditions, $K_D$ is chosen to be 1.0. $K_D$ is further specified to have a continuous transitional characteristic in a color temperature Region II between color temperatures D1 and D2, corresponding to a color temperature (D) indicative of cloudy conditions.

In the embodiment shown, $K_D$ is specified to linearly decrease from a value of $A_D$ at D=D1 to a value of 1.0 at D=D2.

One of ordinary skill in the art will realize that the dependence of the auxiliary enhancement factor $K_D$ on D shown in FIG. 3 is shown for illustrative purposes only, and that $K_D$ may generally have an arbitrary dependence on D. In an embodiment (not shown), $K_D$ may non-linearly decrease with increasing D.

In an embodiment, the auxiliary enhancement factor $K_D$ may be incorporated into the enhancement factor $K(P)$ by setting the parameter KI for $K(P)$ to be the D-dependent auxiliary enhancement factor $K_D$. In this way, the enhancement factor $K(P)$ may be upper-bounded by the auxiliary enhancement factor $K_D$.

Figure 4:
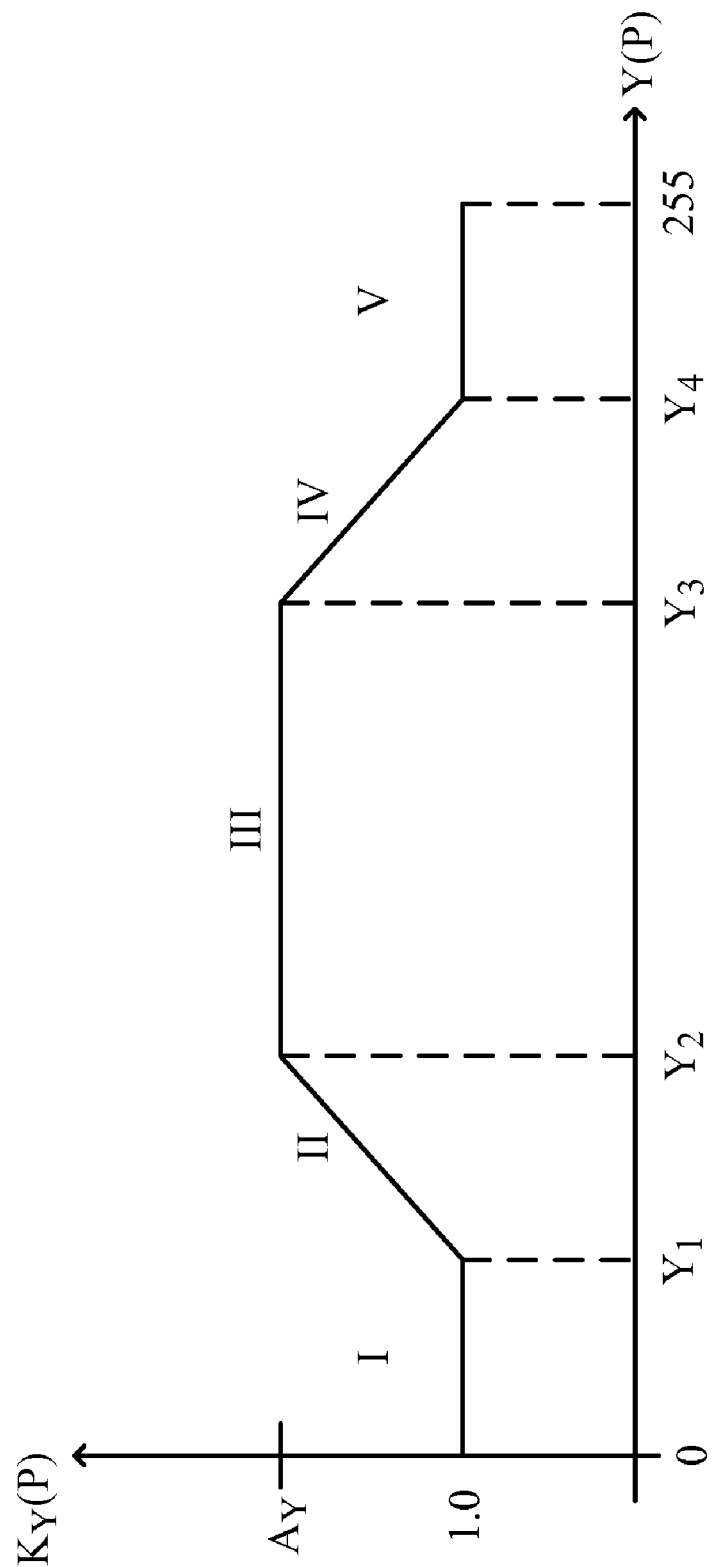
FIG. 4 illustrates an auxiliary enhancement factor $K_Y(P)$ based on the Y coordinate of the pixel P.

FIG. 4 illustrates an auxiliary enhancement factor $K_Y(P)$ based on the Y coordinate of the pixel P. Note the auxiliary enhancement factor $K_Y(P)$ may vary for each specific pixel P evaluated, as compared to the auxiliary enhancement factors $K_{EI}$ and $K_D$ earlier described herein, which may remain constant over all pixels of a given digital image. In FIG. 4, the auxiliary enhancement factor $K_Y(P)$ is chosen to have a constant value equal to 1.0 in Y regions I and V, corresponding to extremely high and low values of Y, and a constant value of $A_Y$ in Y region III, corresponding to a middle range of Y. $K_Y(P)$ is shown increasing in Y region II, and decreasing in Y region IV, wherein both regions II and IV represent transition regions. In the embodiment shown, $K_Y(P)$ is further specified to linearly increase and decrease in the Y regions II and IV, respectively.

One of ordinary skill in the art will realize that the dependence of the auxiliary enhancement factor $K_Y(P)$ on Y shown in FIG. 4 is shown for illustrative purposes only, and that $K_Y(P)$ may generally have an arbitrary dependence on Y.

In an embodiment, the auxiliary enhancement factor $K_Y(P)$ may be incorporated in the enhancement factor $K(P)$ by setting the parameter KI for $K(P)$ to be the Y-component-dependent auxiliary enhancement factor $K_Y(P)$. In this way, the enhancement factor $K(P)$ may be upper-bounded by the auxiliary enhancement factor $K_Y(P)$.

In an embodiment, the auxiliary enhancement factors $K_{EI}$, $K_D$, and $K_Y(P)$ may all be incorporated in the enhancement factor $K(P)$ by setting the parameter AD for the auxiliary enhancement factor $K_D$ to be the auxiliary enhancement factor $K_{EI}$, the parameter $A_Y$ for the auxiliary enhancement factor $K_Y(P)$ to be the auxiliary enhancement factor $K_D$, and the parameter KI for the enhancement factor $K(P)$ of a pixel P to be the auxiliary enhancement factor $K_Y(P)$ of that same pixel P.

Figure 5:
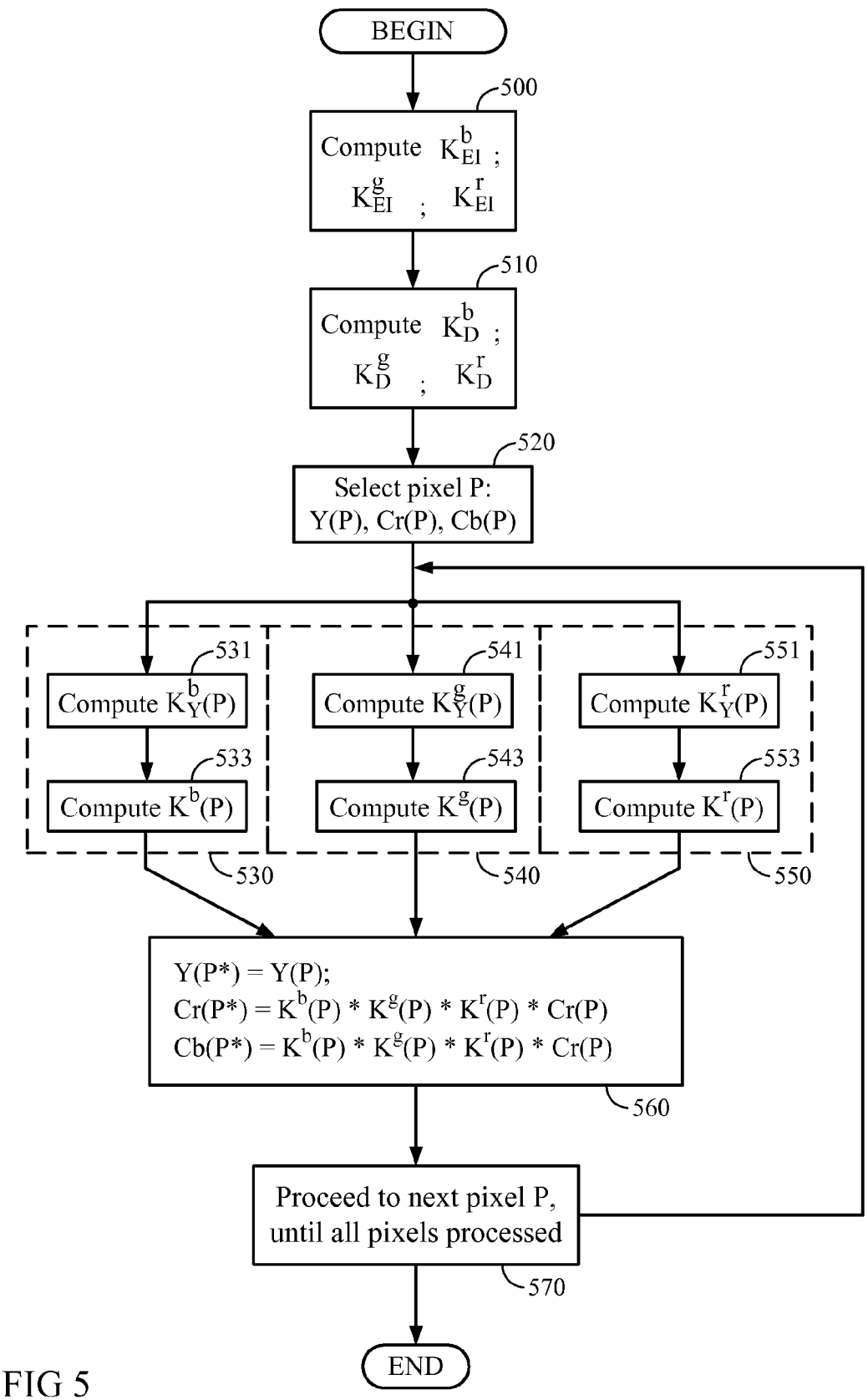
FIG. 5 illustrates a method for enhancing shades of green, blue, and red colors in a digital image using the techniques of the present disclosure.

FIG. 5 illustrates a method for identifying and enhancing shades of green, blue, and red colors in a digital image using the techniques of the present disclosure. Note the method in FIG. 5 is shown for illustrative purposes only, and is not meant to limit the scope of the present disclosure to enhancement of any particular colors or shades of those colors, or to any particular combination of component or enhancement factors used to perform the enhancement.

In FIG. 5, the method begins with a digital image at step 500, wherein auxiliary enhancement factors $K^b_{EI}$, $K^g_{EI}$, and $K^r_{EI}$ are calculated for each of the blue, green, and red enhancement factors, respectively. In an embodiment, each auxiliary enhancement factor may have a characteristic based on an exposure index (EI) of the image, such as described with reference to FIG. 2. One of ordinary skill in the art will appreciate that the parameters $A_{EI}$, EI1, and EI2 described with reference to FIG. 2 may be different for each of the auxiliary enhancement factors $K^b_{EI}$, $K^g_{EI}$, and $K^r_{EI}$. In an embodiment, the parameters may be selected as follows (Table 2):

| Auxiliary enhancement factor | Parameter | Value (Lux) |
|---|---|---|
| $K^b_{EI}$ | EI1 | 800 |
| | EI2 | 4000 |
| $K^g_{EI}$ | EI1 | 600 |
| | EI2 | 2000 |
| $K^r_{EI}$ | EI1 | 800 |
| | EI2 | 3000 |

Note the values given in Table 2 are for illustrative purposes only, and are not intended to limit the scope of the present disclosure to any particular values or EI characteristics shown.

At step 510, the auxiliary enhancement factors $K^b_D$, $K^g_D$, and $K^r_D$ are calculated for each of the blue, green, and red enhancement factors, respectively. In an embodiment, each auxiliary enhancement factor may have a characteristic based on a color temperature (D) of the image, such as described with reference to FIG. 3. One of ordinary skill in the art will appreciate that the parameters $A_D$, D1, and D2 described with reference to FIG. 3 may be different for each of the auxiliary enhancement factors $K^b_D$, $K^g_D$, and $K^r_D$. In an embodiment, the parameters can be selected as follows (Table 3):

| Auxiliary enhancement factor | Parameter | Value |
|---|---|---|
| $K^b_D$ | D1 | D57 |
|  | D2 | D65 |
| $K^g_D$ | D1 | D65 |
|  | D2 | D75 |
| $K^r_D$ | D1 | D65 |
|  | D2 | D75 |

Note the values given in Table 3 are for illustrative purposes only, and are not intended to limit the scope of the present disclosure to any particular values shown.

At step 520, a pixel P having coordinates Y(P), Cb(P), and Cr(P) is selected for subsequent pixel-specific processing according to the techniques of the present disclosure. Subsequent to step 520, the method is shown proceeding along three parallel branches 530, 540, 550.

In branch 530, the auxiliary enhancement factor $K^b_Y(P)$ for the pixel P is computed at step 531. In an embodiment, $K^b_Y(P)$ may be a function of the coordinate Y(P) of pixel P, such as described with reference to FIG. 4.

At step 533, the enhancement factor $K^b(P)$ is computed for the pixel P. In an embodiment, $K^b(P)$ may be a function of the coordinates Cr(P)-Cb(P) of pixel P such as described with reference to FIG. 1. Note the parameters of the enhancement factor $K^b(P)$ may generally be chosen to detect and emphasize target shades of blue in a pixel P. The enhancement factor $K^b(P)$ may incorporate any or all of the auxiliary enhancement factors $K^b_Y(P)$, $K_D$, or $K_{EI}$, as earlier described hereinabove.

Operations performed in branches 540 and 550 for the green and red enhancement factors, respectively, may be similar those described in branch 530 for the blue enhancement factor. In particular, at steps 541 and 551, $K^g_Y(P)$ and $K^r_Y(P)$ may be computed for the green and red colors, respectively. At steps 543 and 553, the enhancement factors $K^g(P)$ and $K^r(P)$ may be computed.

In an embodiment, the parameters of the auxiliary enhancement factors $K^b_Y(P)$, $K^g_Y(P)$, and $K^r_Y(P)$ may be chosen as follows (Table 4):

| Auxiliary enhancement factor | Parameter | Value (0-255) |
|---|---|---|
| $K^b_Y(P)$ | Y1 | 60 |
|  | Y2 | 100 |
|  | Y3 | 220 |
|  | Y4 | 245 |
| $K^g_Y(P)$ | Y1 | 20 |
|  | Y2 | 40 |
|  | Y3 | 200 |
|  | Y4 | 220 |
| $K^r_Y(P)$ | Y1 | 60 |
|  | Y2 | 80 |
|  | Y3 | 200 |
|  | Y4 | 240 |

At step 560, color enhancement is performed on the pixel P using the transformations as earlier described with reference to Equations 1, with enhancement factors $K^b(P)$, $K^g(P)$, $K^r(P)$ derived from steps 533, 543, 553, respectively.

At step 570, the method proceeds to the next pixel P and returns to branches 530, 540, 550 to re-derive the pixel-specific auxiliary enhancement factors for the next pixel. When all pixels in an image have been evaluated and enhanced, then the method terminates.

Figure 6:
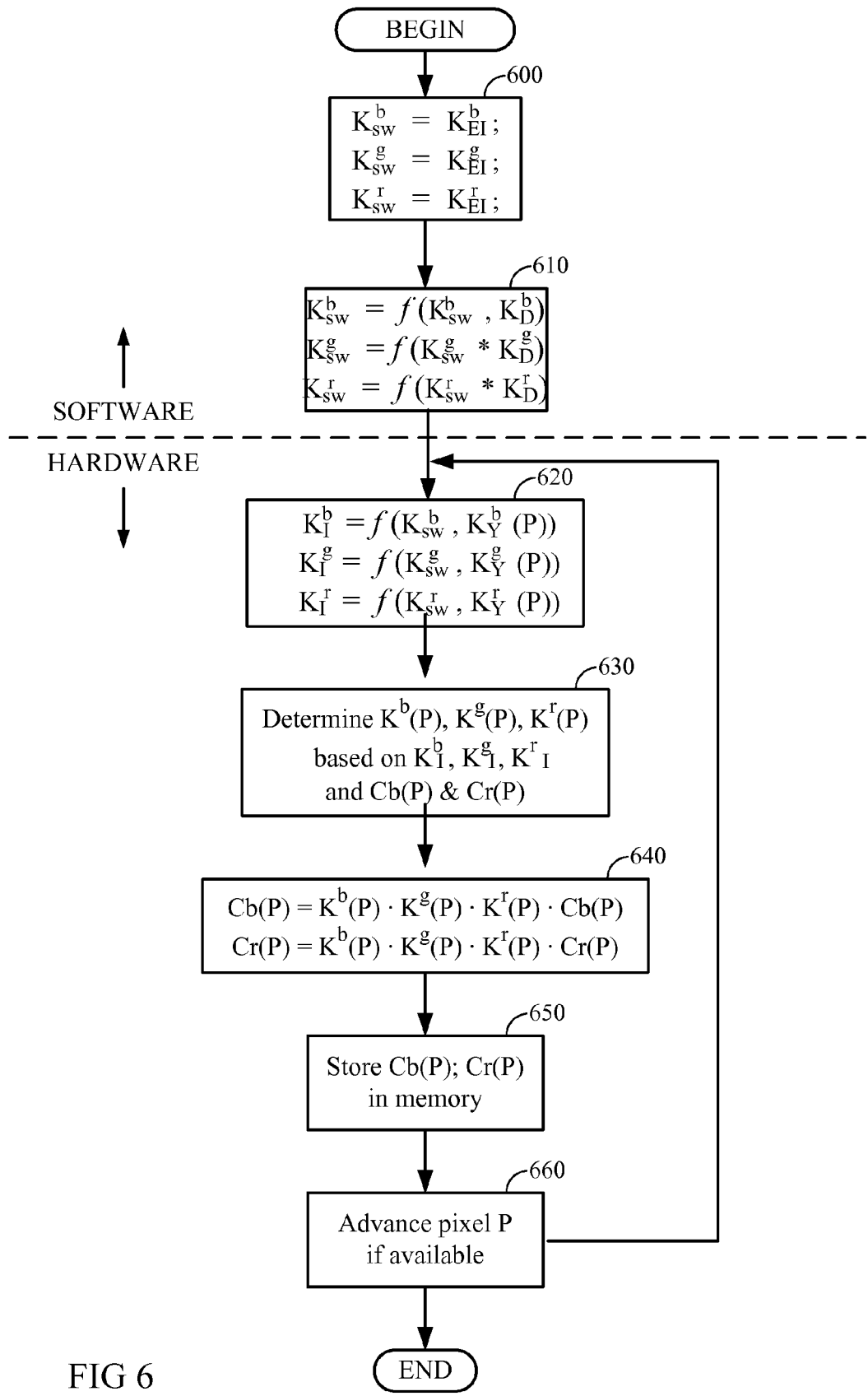
FIG. 6 depicts an embodiment of a method wherein the operations in FIG. 5 are divided between image-specific operations performed by a software module, and pixel-specific operations performed by a hardware module.

FIG. 6 depicts an embodiment of a method wherein the operations in FIG. 5 are divided between image-specific operations performed by a software module, and pixel-specific operations performed by a hardware module.

In FIG. 6, the method begins at step 600 by initializing variables $K^b_{SW}$, $K^g_{SW}$, and $K^r_{SW}$ to initial values based on values $K^b_{EI}$, $K^g_{EI}$, and $K^r_{EI}$ as obtained from the exposure index (EI), as described with reference to FIG. 2. The operations of step 600 may be performed in software, as indicated in FIG. 6, once per digital image, depending on the exposure index for the image.

At step 610, the variables $K^b_{SW}$, $K^g_{SW}$, and $K^r_{SW}$ are further modified by the values of $K^b_D$, $K^g_D$, and $K^r_D$ as obtained from the color temperature (D), as described with reference to FIG. 3. The operations of step 610 may be performed in software, as indicated in FIG. 6, once per digital image, depending on the color temperature for the image.

At step 620, the variables $K^b_I$, $K^g_I$, $K^r_I$ for a pixel P are computed from the variables $K^b_{SW}$, $K^g_{SW}$, $K^r_{SW}$ determined from step 610, and the values of $K^b_Y(P)$, $K^g_Y(P)$, $K^r_Y(P)$ as obtained from the Y(P) coordinates of the pixel P, described with reference to FIG. 4. The operations of step 620 may be performed on a per-pixel basis in hardware, as indicated in FIG. 6.

At step 630, the variables $K^b(P)$, $K^g(P)$, $K^r(P)$ for the pixel P are determined from the values of $K^b_I$, $K^g_I$, and $K^r_I$, as obtained from the Cr(P)-Cb(P) coordinates of pixel P, described with reference to FIG. 4. The operations of step 630 may be performed on a per-pixel basis in hardware, as indicated in FIG. 6.

At step 640, the coordinates Cb(P) and Cr(P) are multiplied by the variables $K^b(P)$, $K^g(P)$, $K^r(P)$ as computed at step 630.

At step 650, the newly computed coordinates Cb(P) and Cr(P) may be stored in a memory corresponding to the digital image.

At step 660, the method advances the pixel P to a next value, if available, and returns to step 620 to re-derive the pixel-specific enhancement factors.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The invention claimed is:

1. A method for evaluating and enhancing the color of pixels in a digital image, each pixel having associated Y-Cb-Cr coordinates, the method comprising:
   multiplying the Cb coordinate of each pixel by a Cb enhancement factor;
   multiplying the Cr coordinate of each pixel by a Cr enhancement factor;
   wherein each of the Cb and Cr enhancement factors have a no-enhancement value when the corresponding Cb-Cr coordinates of a pixel lie in a region corresponding to a color shade not to be enhanced; and
   wherein each of the Cb and Cr enhancement factors have a full-enhancement value when the corresponding Cb-Cr coordinates of a pixel lie in a region corresponding to a color shade to be enhanced, the full-enhancement value comprising at last one of:
      an exposure index (EI) auxiliary enhancement factor, the EI auxiliary enhancement factor being a function of an exposure index of the digital image,
      a color temperature (D) auxiliary enhancement factor, the D auxiliary enhancement factor being a function of a color temperature of the digital image, or
      a Y auxiliary enhancement factor, the Y auxiliary enhancement factor being a function of the Y coordinate of a pixel P in the digital image.

2. The method of claim 1, the Cb enhancement factor being equal to the Cr enhancement factor.

3. The method of claim 2, each enhancement factor having a no-enhancement value when the corresponding Cb-Cr coordinates of a pixel lie in a Cb-Cr Region III, and a full-enhancement value when the corresponding Cb-Cr coordinates of a pixel lie in a Cb-Cr Region I, the Cb-Cr Region I corresponding to the Cb-Cr coordinates of a color shade to be enhanced, and the Cb-Cr Region III corresponding to the Cb-Cr coordinates of a color shade not to be enhanced.

4. The method of claim 3, the no-enhancement value being 1.0, the full-enhancement value being greater than 1.0.

5. The method of claim 3, the Cb-Cr Region I corresponding to a shade of green associated with outdoor foliage.

6. The method of claim 3, the Cb-Cr Region I corresponding to a shade of blue associated with the sky.

7. The method of claim 3, the Cb-Cr Region I corresponding to a shade of red.

8. The method of claim 3, each enhancement factor having a transition value greater than 1.0 and less than the full-enhancement value, when the corresponding Cb-Cr coordinates of a pixel lie in a Cb-Cr Region II, the Cb-Cr Region II lying between Cb-Cr Regions I and III.

9. The method of claim 8, the transition value being a function of the relative distance of the Cb-Cr coordinates of the pixel from Region I versus Region III.

10. The method of claim 9, the transition value being a linear function of the relative distance of the Cb-Cr coordinates of the pixel from Region I versus Region III.

11. The method of claim 1, the EI auxiliary enhancement factor having a value AEI greater than 1.0 when the EI is less than a value EI1, the EI auxiliary enhancement factor having a value of 1.0 when the EI is more than a value EI2.

12. The method of claim 11, the EI auxiliary enhancement factor having a value that is a function of the relative difference between the EI of the image and EI1 and EI2, when the EI is between EI1 and EI2.

13. The method of claim 12, the EI auxiliary enhancement factor having a value that is a linear function of the relative difference between the EI of the image and EI1 and EI2, when the EI is between EI1 and EI2.

14. The method of claim 1, the D auxiliary enhancement factor having a value AD greater than 1.0 when the D is less than a value D1, the D auxiliary enhancement factor having a value of 1.0 when the D is more than a value D2.

15. The method of claim 14, the D auxiliary enhancement factor having a value that is a function of the relative difference between the D of the image and D1 and D2, when the D is between D1 and D2.

16. The method of claim 15, the D auxiliary enhancement factor having a value that is a linear function of the relative difference between the D of the image and D1 and D2, when the D is between D1 and D2.

17. The method of claim 1, the Y auxiliary enhancement factor having a value A; when the Y-coordinate of a pixel P lies in a range from a value Y2 to a value Y3.

18. The method of claim 3, the full-enhancement value comprising:
   a Y auxiliary enhancement factor, the Y auxiliary enhancement factor being a function of the Y-coordinate of a pixel P;
   an exposure index (EI) auxiliary enhancement factor, the EI auxiliary enhancement factor being a function of an exposure index of the digital image; and
   a color temperature (D) auxiliary enhancement factor, the D auxiliary enhancement factor being a function of a color temperature of the digital image.

19. The method of claim 18, the full-enhancement value of the pixel P being the Y auxiliary enhancement factor of the pixel P, the maximum value of the Y auxiliary enhancement factor of the pixel P being the color temperature CD) auxiliary enhancement factor, the maximum value of the color temperature CD) auxiliary factor being the exposure index auxiliary enhancement factor.

20. The method of claim 19, further comprising:
   computing the exposure index auxiliary enhancement factor and the color temperature auxiliary enhancement factor using a microprocessor; and
   computing the Y auxiliary enhancement factor for each pixel using special-purpose hardware.

21. The method of claim 20, further comprising: computing the enhancement factor for each pixel using special-purpose hardware.

22. An apparatus for evaluating and enhancing the color of pixels in a digital image, each pixel having associated Y-Cb-Cr coordinates, the apparatus comprising:
   a multiplier for multiplying the Cb coordinate of each pixel by a Cb enhancement factor; and
   a multiplier for multiplying the Cr coordinate of each pixel by a Cr enhancement factor;
   wherein each of the Cb and Cr enhancement factors have a no-enhancement value when the corresponding Cb-Cr coordinates of a pixel lie in a region corresponding to a color shade not to be enhanced; and wherein each of the Cb and Cr enhancement factors have a full-enhancement value when the corresponding Cb-Cr coordinates of a pixel lie in a region corresponding to a color shade to be enhanced, and wherein the full-enhancement value is selected from at least one of:
  an exposure index (EI) auxiliary enhancement factor, the EI auxiliary enhancement factor being a function of an exposure index of the digital image,
  a color temperature (D) auxiliary enhancement factor, the D auxiliary enhancement factor being a function of a color temperature of the digital image, or
  a Y auxiliary enhancement factor, the Y auxiliary enhancement factor being a function of the Y coordinate of a pixel P in the digital image.

23. The apparatus of claim 22, the Cb enhancement factor being equal to the Cr enhancement factor.

24. The apparatus of claim 23, each enhancement factor having a no-enhancement value when the corresponding Cb-Cr coordinates of a pixel lie in a Cb-Cr Region III, and a full-enhancement value when the corresponding Cb-Cr coordinates of a pixel lie in a Cb-Cr Region I, the Cb-Cr Region I corresponding to the Cb-Cr coordinates of a color shade to be enhanced, and the Cb-Cr Region III corresponding to the Cb-Cr coordinates of a color shade not to be enhanced.

25. The apparatus of claim 24, each enhancement factor having a transition value greater than 1.0 and less than the full-enhancement value, when the corresponding Cb-Cr coordinates of a pixel lie in a Cb-Cr Region II, the Cb-Cr Region II lying between Cb-Cr Regions I and III.

26. The apparatus of claim 24, wherein the full-enhancement value comprising:
  a Y auxiliary enhancement factor,
  the exposure index (EI) auxiliary enhancement factor; and
  a color temperature (D) auxiliary enhancement factor.

27. An apparatus for evaluating and enhancing the color of pixels in a digital image, each pixel having associated Y-Cb-Cr coordinates, the apparatus comprising:
  means for enhancing the Cb coordinate of each pixel by a Cb enhancement factor;
  means for enhancing the Cr coordinate of each pixel by a Cr enhancement factor, wherein the Cb enhancement factor and the Cr enhancement factor are different;
  wherein each of the Cb and Cr enhancement factors have a full-enhancement value when the corresponding Cb-Cr coordinates of a pixel lie in a region corresponding to a color shade to be enhanced, and wherein the full-enhancement value is selected from at least one of:
    an exposure index (EI) auxiliary enhancement factor, the EI auxiliary enhancement factor being a function of an exposure index of the digital image,
    a color temperature (D) auxiliary enhancement factor, the D auxiliary enhancement factor being a function of a color temperature of the digital image, or
    a Y auxiliary enhancement factor, the Y auxiliary enhancement factor being a function of the Y coordinate of a pixel P in the digital image.

28. The apparatus of claim 27, further comprising software means for adjusting each enhancement factor based on an exposure index and a color temperature, and hardware means for computing auxiliary enhancement means for adjusting each enhancement factor based on a Y-coordinate of each pixel.

29. A computer program product for evaluating and enhancing the color of pixels in a digital image, each pixel having associated Y-Cb-Cr coordinates, the product comprising:
  a non-transitory computer-readable medium comprising:
    code for causing a computer to multiply the Cb coordinate of each pixel by a Cb enhancement factor; and code for causing a computer to multiply the Cr coordinate of each pixel by a Cr enhancement factor;
  wherein each of the Cb and Cr enhancement factors have a no-enhancement value when the corresponding Cb-Cr coordinates of a pixel lie in a region corresponding to a color shade not to be enhanced; and
  wherein each of the Cb and Cr enhancement factors have a full-enhancement value when the corresponding Cb-Cr coordinates of a pixel lie in a region corresponding to a color shade to be enhanced, the full-enhancement value comprising at least one of:
    an exposure index (EI) auxiliary enhancement factor, the EI auxiliary enhancement factor being a function of an exposure index of the digital image,
    a color temperature (D) auxiliary enhancement factor, the D auxiliary enhancement factor being a function of a color temperature of the digital image, or
    a Y auxiliary enhancement factor, the Y auxiliary enhancement factor being a function of the Y coordinate of a pixel P in the digital image.

30. The computer program product of claim 29, the full-enhancement value comprising the exposure index (EI) auxiliary enhancement factor, the color temperature (D) auxiliary enhancement factor, and Y auxiliary enhancement factor.

* * * * *